United States Patent [19]
Asako et al.

[11] Patent Number: 5,668,187
[45] Date of Patent: Sep. 16, 1997

[54] PROCESS FOR THE PREPARATION OF RIGID POLYURETHANE FOAM

[75] Inventors: Shinichi Asako, Yamato; Hajime Uchida, Yokosuka, both of Japan

[73] Assignees: Air Products and Chemicals, Inc., Allentown, Pa.; Nippon Nyukazai Co. Ltd., Kawasaki, Japan

[21] Appl. No.: 646,432

[22] Filed: May 7, 1996

Related U.S. Application Data

[63] Continuation of Ser. No. 310,534, Sep. 22, 1994, now abandoned.
[51] Int. Cl.$^6$ .................................................. C08G 18/30
[52] U.S. Cl. .................................... 521/137; 521/122
[58] Field of Search ...................................... 521/137

[56] References Cited

U.S. PATENT DOCUMENTS

| | | | |
|---|---|---|---|
| 3,085,983 | 4/1963 | Hardy | 521/137 |
| 3,755,211 | 8/1973 | Fabris et al. | 521/137 |
| 3,948,826 | 4/1976 | Smalheiser | 521/137 |

*Primary Examiner*—Rachel Gorr
*Attorney, Agent, or Firm*—Michael Leach; William F. Marsh

[57] ABSTRACT

In a process for the preparation of rigid polyurethane foam from a polyol and a polyisocyanate, it is possible to prepare rigid polyurethane foam by using an aqueous polymer emulsion comprising a polymer of ethylenically unsaturated monomers whereby the amount of chlorofluorocarbon used can be decreased or eliminated.

18 Claims, No Drawings

PROCESS FOR THE PREPARATION OF RIGID POLYURETHANE FOAM

This is a continuation of application Ser. No. 08/310,534 filed Sep. 22, 1994, now abandoned.

TECHNICAL FIELD

The present invention relates to a process for the preparation of rigid polyurethane foam, more particularly to a process for improving the physical properties of rigid polyurethane foam.

BACKGROUND OF THE INVENTION

Rigid polyurethane foam has been prepared by the reaction of a polyfunctional isocyanate with a polyol such as a polyester polyol, polyether polyol or the like using a foaming agent in the presence of an amine catalyst, metal catalyst or the like. Useful rigid foams typically have good adiabatic and lightweight structural properties. Therefore, rigid foams can widely be used as heat insulating materials, building materials, structural materials and the like materials.

Previously, in case of the preparation of rigid polyurethane foam, there have been used as blowing agents chlorofluorocarbons such as CFC-11 or CFC-12 and water. Recently from the view point of environmental destruction, the use of chlorofluorocarbons have been restricted. It is desired that the blowing agents comprise water alone, or in case of a combination of chlorofluorocarbon and water, a large quantity of water and a minimum amount of chlorofluorocarbon.

However, when water alone or a large quantity of water is used as a blowing agent, water reacts predominantly with isocyanate to form highly crystalline urea bonding instead of the desired reaction of the isocyanate with a polyol. This results in the deterioration of, for example, dimensional stability, friability, adiabatic and adhesive properties. In order to overcome these problems processes using a polymer polyol prepared by the polymerization of an ethylenic unsaturated monomer in a polyol are disclosed in JP 90/281,021, JP 91/287,639 and JP 92/239,516; but the prevention of the deterioration of physical properties has not been satisfactory.

SUMMARY OF THE INVENTION

The invention pertains to the preparation of rigid polyurethane foam by reacting a polyol with a polyisocyanate in the presence of a catalyst, a blowing agent and, optionally, a surfactant. Rigid polyurethane foam having excellent physical properties can be prepared by using water comprising a polymer of ethylenically unsaturated monomers in an emulsified, or dispersed, form as a blowing agent. Advantageously, the deterioration of physical properties, which arises when water is used as a blowing agent, is avoided.

Thus, the present invention provides a method for alleviating the deterioration of physical properties arising from the preparation of rigid polyurethane foam when water is used as a blowing agent.

DETAILED DESCRIPTION OF THE INVENTION

The invention relates to improving the properties of rigid polyurethane foam by using an aqueous polymer emulsion comprising a polymer of ethylenically unsaturated monomers as the blowing agent in the preparation of the rigid foam.

The process according to the present invention can easily be carried out by conventional means for making rigid polyurethane foam, excepting that the general preparation of rigid polyurethane foam using water as a blowing agent is carried out using an aqueous polymer emulsion comprising a polymer of ethylenically unsaturated monomers instead of water.

Suitable aqueous polymer emulsions for use in this invention can easily be prepared according to well-known emulsion polymerization techniques by polymerizing an ethylenically unsaturated monomer emulsified and dispersed in water with an emulsifier, such as a surfactant or protective colloid. For example, the emulsion polymerization can easily be carried out by dispersing at least one emulsifiable monomer in water in the concentration of 20 to 70 wt % in the presence of 0.1 to 10 parts by weight of an emulsifier per 100 parts by weight of monomer followed by adding 1 to 2 parts by weight of an initiator per 100 parts by weight of monomer.

Polymerization can normally be carried out at a temperature of 40° to 90° C. and the time required for the polymerization is normally a range of 2 to 10 hours. The reaction can also be carried out under pressure, when a monomer having a high vapor pressure is used. The reaction, if necessary, can be carried out using a pH regulator, polymerization modifier and other well-known additives. Alternatively, an aqueous polymer emulsion comprising a polymer of ethylenically unsaturated monomers used in this invention can be prepared by polymerizing an ethylenically unsaturated monomer in an organic solvent and then by emulsifying and dispersing the resulting polymer in water with a surfactant.

There is no particular limitation upon the kind of the ethylenically unsaturated monomer used, provided that it is a monomer capable of forming an aqueous polymer emulsion comprising a polymer. Thus, the deterioration of physical properties of rigid polyurethane foam prepared using water as a blowing agent can be improved by making a suitable choice of monomers.

Examples of preferred ethylenically unsaturated monomers include: hydrocarbon monomers such as ethylene, butadiene, isoprene, 1,4-pentadiene, 1,6-hexadiene, 1,7-octadiene, styrene, α-methylstyrene, 2,4-dimethylstyrene, ethylstyrene, isopropylstyrene, butylstyrene, phenylstyrene, cyclohexylstyrene and benzylstyrene; substituted styrenes such as chlorostyrene, 2,5-dichlorostyrene, bromostyrene, fluorostyrene, trifluorostyrene, iodostyrene, cyanostyrene, nitrostyrene and N,N-dimethylaminostyrene; (meth)acrylic monomers, i.e., acrylic and methacrylic monomers, such as methyl (meth)acrylate, butyl (meth)acrylate, 2-ethylhexyl (meth)acrylate, cyclohexyl (meth)acrylate, benzyl (meth)acrylate, isopropyl (meth)acrylate, octyl (meth)acrylate, phenyl (meth)acrylate, dimethylaminoethyl methacrylate, glycidyl acrylate, (meth)acrylonitrile, 2-hydroxyethyl (meth)acrylate, 2-hydroxypropyl (meth)acrylate, 4-hydroxybutyl acrylate, 4-hydroxybutyl methacrylate, 6-hydroxyhexyl (meth)acrylate, mono- or di -(meth)acrylate of polyethylene glycol, mono- or di-(meth)acrylate of polypropylene glycol, mono- or di-(meth)acrylate of polybutylene glycol, mono- or di-(meth)acrylate of alkylene glycol prepared from two or more alkylene oxides (containing 2 to 4 carbon atoms), (meth)acrylic acid; vinyl ethers or vinyl esters such as vinyl acetate, vinyl chloroacetate, vinyl butylate, isopropanol acetate, vinyl formate, vinyl methacrylate, vinyl methoxyacetate, vinyl benzoate, vinyl naphthalene, vinylidene bromide, vinyl methyl ether, vinyl ethyl ether, vinyl propylene ether, vinyl butyl ether, vinyl 2-ethylhexyl ether, vinyl phenyl ether, vinyl 2-methoxyethyl ether, vinyl ethyl ketone or vinyl phenyl ketone; and organic acids having a double bond and their derivatives such as dimethyl maleate, dimethyl fumarate, monomethyl itaconate, maleic acid, itaconic acid or fumaric acid. Styrene, methyl methacrylate, butyl acrylate, 2-ethylhexyl acrylate, 2-hydroxyethyl acrylate or methacrylate, mono-acrylate or -methacrylate of polyethylene glycol, acrylic acid, methacrylic acid and the like are particularly preferred. These monomers can be used alone or in a combination of two or more monomers.

The aqueous polymer emulsion at 20 to 70 wt % solids, preferably 30 to 50 wt % solids, is used as a blowing agent in the rigid polyurethane foam formulation in an amount ranging from 0.5 to 20 parts polymer/100 parts polyol (pphp), preferably 1 to 15 pphp, most preferably 1 to 10 pphp. Below the lower use level of the polymer emulsion, the prepared rigid polyurethane foam physical properties are not improved. Above the higher use level the polymer emulsion does not mix well into the polyol side.

Suitable polyisocyanates for use in the preparation of rigid polyurethane foam using an aqueous polymer emulsion according to the present invention are those which are normally used in the preparation of rigid polyurethane foam. Examples of suitable isocyanates include, for example, tolylene 2,4-diisocyanate, tolylene 2,6-diisocyanate, diphenylmethane 4,4'-diisocyanate, hexamethylene diisocyanate, isophorone diisocyanate, xylene diisocyanate and the like. Preferably the above polyisocyanates are used in an isocyanate index range of 80 to 300.

There is no particular limitation upon the kind of the polyol used in this invention and generally well-known polyether polyols and polyester polyols can be used. Examples of suitable polyols include, for example, polyether polyols, which can be prepared by an addition reaction of a polyhydric alcohol, for example glycol, glycerin, pentaerythritol, trimethylol propane, sucrose or the like with ethylene oxide or propylene oxide; amine polyols, which can be prepared by an addition reaction of an amine such as ethylenediamine, diethylenetriamine, tolylenediamine, diphenylmethanediamine, triethanolamine or the like with ethylene oxide or propylene oxide; polyester polyols, which can be prepared from a polybasic organic acid and a polyhydric alcohol, preferably a polyether polyol; and so-called polymer polyols, which can be prepared by polymerization of an ethylenically unsaturated monomer in a polyether polyol and/or a polyester polyol.

In the preparation of rigid polyurethane foam according to this invention, any catalyst used generally in the preparation of urethane polymer can be used. Typical examples of useful catalysts are amine catalysts such as triethylenediamine, dimethylcyclohexylamine, tetramethylhexanediamine, bis(dimethylaminoethyl) ether, tri(dimethylaminopropyl) hexahydrotriamine, 1-isobutyl-2-methylimidazole, 1,2-dimethylimidazole, dimethylaminoethanol, diethylaminoethanol, pentamethyldiethylenetriamine, pentamethyldipropylenetriamine, methylmorpholine, ethylmorpholine, quaternary ammonium salts, salts of an organic acid and tin catalysts such as stannous acetate, dibutyltin dilaurate and the like.

In the preparation of rigid polyurethane foam there can be used surfactants such as an organopolysiloxane, fire retardants such as a halogenated organophosphorus compound and other additives customarily used. A process according to the present invention can easily be carried out by also using hydrochlorofluorocarbon such as HCFC-141b, HCFC-22 or HCFC-123 as a blowing agent.

In the following examples, parts are parts by weight.

PREPARATION EXAMPLE A

A 2-liter 3-necked flask fitted with a mechanical stirrer, thermometer, condenser and nitrogen inlet was charged with 650 g of deionized water, 10 g of a surfactant (Newool 271A, a product of Nippon Nyukazai Co. Ltd.) and 15 g of a monomer mixture consisting of 33.3 parts of styrene, 66.7 parts of n-butyl acrylate and 2 parts of acrylic acid and the mixture was maintained at 80° C. in a stream of nitrogen. A solution of 1 g of ammonium persulfate in 50 g of deionized water was added thereto followed by allowing to react at 80°±1° C. for 30 minutes. To the reaction mixture were dropwise added 285 g of a monomer mixture consisting of the same composition as described above at 80°±1° C. during a period of an hour followed by allowing to react at 80±1° C. for 4 hours. After completion of the reaction, the pH of the reaction mixture was adjusted to 7.5 with aqueous ammonia to give an aqueous polymer emulsion (A) as a milk-white liquid having viscosity of 70 cps at 20° C. The liquid comprised 30% by weight solids and 70% by weight of water content.

PREPARATION EXAMPLES B TO H

The procedure of Preparation Example A was repeated, but using the monomer mixtures listed in Table 1, to obtain aqueous polymer emulsions (B) to (H) as milk-white liquids having the viscosities shown in Table 1.

TABLE 1

| Aqueous Polymer Emulsion | A | B | C | D | E | F | G | H |
|---|---|---|---|---|---|---|---|---|
| Monomer composition (wt part): | | | | | | | | |
| Styrene | 33.3 | 100.0 | 30.0 | 99.5 | 90.0 | | | 50.0 |
| Acrylic acid | 2.0 | 2.0 | 2.0 | 0.5 | | 2.0 | | 2.0 |
| n-BA | 66.7 | | 60.0 | | | 90.0 | 60.0 | |
| 2-HEMA | | | 10.0 | | | | | |
| MA-100 | | | | | 10.0 | 10.0 | 40.0 | |
| 2-EHA | | | | | | | | 50.0 |
| Property of aqueous polymer emulsion: | | | | | | | | |
| Solids Content (wt %) | 30.0 | 50.0 | 30.0 | 40.0 | 30.0 | 40.0 | 30.0 | 35.0 |
| Viscosity (cps/20°C.) | 70 | 95 | 95 | 90 | 105 | 90 | 90 | 110 | n BA: n-Butyl acrylate
2-HEMA: 2-Hydroxyethyl methacrylate
MA-100: Polyethylene glycol monomethacrylate (average molecular weight: 526)
2-EHA: 2-Ethylhexyl acrylate

EXAMPLE 1

Using the rigid foam formulation listed in Table 2 and the aqueous polymer emulsion (A) prepared in Preparation Example A, there was prepared rigid polyurethane foam having physical properties shown in Table 3. The results show that the dimensional stability of the foam thus obtained was notably superior to any of those of the Comparative Examples. The preparation of rigid polyurethane foam and the measurement of physical properties thereof were performed as follows.

A mixture comprising a polyol, silicone surfactant, amine catalyst and aqueous polymer emulsion was mixed under stirring to give 112 g of a mixture. To the mixture maintained at 20°±1° C. were added 209.2 g of an isocyanate maintained at 20°±1° C., and the resulting mixture was stirred at about 5,000 rpm for a period of 5 seconds and quickly poured into a wooden box lined with a polyethylene sheet (20 cm×20 cm) to form urethane foam (the upper part of the wooden box was open).

Cream time, gel time, rise time and tack free time were measured as follows. The term "cream time" denotes the time elapsed from mixing with MDI CR-200 and other chemical (s) to the start of swelling of the foam mixture; the term "gel time" denotes the time required for developing the viscosity of the foam mixture, the term "rise time" denotes the time required for attaining the maximum foam height, and the term "tack free time" denotes the time elapsed until the foam is non-tacky. The foam density of the polyurethane foam prepared was measured as defined according to JIS K S401. Dimensional stability rate was measured by cutting the polyurethane foam to make a core foam in a size of 8×8×2.5 cm and determining the change of its dimensions after standing for 48 hours at a temperature of 23°±1° C. and a humidity of 50±5%.

TABLE 2

Rigid Foam Formulation

| Composition | Part by Weight |
| --- | --- |
| Polyol | 100 |
| Silicone Surfactant | 2.0 |
| Amine Catalyst | 2.0 |
| Aqueous Polymer Emulsion (A) | 8.0 |
| Isocyanate | 209.2 |

Polyol: Sucrose polyether SU 450L (a product of Mitsui Toatsu Chemicals, Inc.)
Silicone surfactant: L-5420 (a product of Nippon Unicar Co., Ltd.)
Amine catalyst: Tetramethylhexanediamine
Isocyanate: MDI CR-200 (a product of Mitsui Toatsu Chemicals, Inc.)

EXAMPLES 2 to 9

The procedure of Example 1 was repeated using the aqueous polymer emulsion and the amount of isocyanate shown in Table 3. Foams having improved dimensional stability were obtained. The results are also shown in Table 3.

TABLE 3

|  | Example 1 | Example 2 | Example 3 | Example 4 | Example 5 | Example 6 |
| --- | --- | --- | --- | --- | --- | --- |
| Aqueous polymer emulsion | A | B | C | D | D | E |
| Amount of aqueous polymer (emulsion wt part) | 8.0 | 11.2 | 8.0 | 10.0 | 13.3 | 8.6 |
| Isocyanate (wt part) | 209.2 | 209.2 | 209.2 | 205.4 | 238.0 | 205.4 |
| Isocyanate index | 110 | 110 | 110 | 105 | 105 | 106 |
| Reactivity (sec): |  |  |  |  |  |  |
| Cream time | 18 | 20 | 18 | 20 | 19 | 18 |
| Gel time | 54 | 56 | 56 | 52 | 57 | 56 |
| Rise time | 68 | 71 | 73 | 67 | 69 | 71 |
| Tack free time | 87 | 90 | 91 | 84 | 89 | 93 |
| Physical properties of foam: |  |  |  |  |  |  |
| Foam density (kg/m$^3$) | 27.3 | 27.1 | 27.4 | 26.4 | 22.0 | 26.7 |
| Dimensional stability (%) |  |  |  |  |  |  |
| vertical to foaming direction | 0 | 0 | 3.1 | 0 | 0 | 0 |
| parallel to foaming direction | 0 | −4.2 | −8.0 | −1.1 | 0.1 | −1.6 |

|  | Example 7 | Example 8 | Example 9 | Comparative Example 1 | Comparative Example 2 |
| --- | --- | --- | --- | --- | --- |
| Aqueous polymer emulsion | F | G | H |  |  |
| Amount of aqueous polymer emulsion (wt part) | 10.0 | 8.6 | 9.2 |  |  |
| Isocyanate (wt part) | 205.4 | 238.0 | 205.4 | 209.2 | 205.4 |
| Isocyanate index | 105 | 105 | 105 | 110 | 105 |
| Reactivity (sec): |  |  |  |  |  |
| Cream time | 17 | 18 | 18 | 18 | 17 |
| Gel time | 56 | 57 | 54 | 54 | 52 |
| Rise time | 69 | 70 | 68 | 70 | 72 |
| Tack free time | 95 | 96 | 87 | 90 | 83 |
| Physical properties of foam: |  |  |  |  |  |
| Foam density (kg/m$^3$) | 26.7 | 26.5 | 26.3 | 28.3 | 26.6 |
| Dimensional stability (%) |  |  |  |  |  |
| vertical to foaming direction | 0 | 0 | 0 | 5.2 | −6.2 |
| parallel to foaming direction | 0.4 | 0.5 | −0.2 | −27.7 | −33.6 |

EXAMPLES 10 and 11

The procedure of Example 1 was repeated using aqueous polymer emulsions (D) and (G), respectively, and the rigid foam formulation shown in Table 4. The physical properties of the rigid foams are shown in Table 5. The result shows that the dimensional stabilities of the foams prepared according to the invention is notably superior to those of Comparative Examples.

TABLE 4

| Rigid Foam Formulation | |
|---|---|
| Composition | Parts by Weight |
| Polyol | 100 |
| Silicone Surfactant | 1.0 |
| Amine Catalyst | 4.6 |
| HCFC-141b | 55.0 |
| Isocyanate | 289.0 |
| Isocyanate index | 200 |

The type of the aqueous polymer emulsion used is described in Table 6.

Polyol: Amine polyether [a mixture of 30 parts by weight of AE-302 (a product of Chiba Polyol Co., Ltd.) and 70 parts by weight of SU-450L (a product of Mitsui Toatsu Chemicals, Inc.)]

Silicone surfactant: B-8404 (a product of Goldschmidt Co., Ltd.)

Amine catalyst: Tetramethylhexanediamine

Amine catalyst: A mixture of 13 parts by weight of aminoalcohol 2 Mabs (a product of Nippon Nyukazai Co., Ltd.) 22 parts by weight of DABCO DC-2 and 65 parts by weight of DABCO TMR (products of Air Products and Chemicals, Inc.)

HCFC-141b: Dichloromonofluoromethane

COMPARATIVE EXAMPLE 1

A rigid polyurethane foam was prepared according to Example 1 using 5.6 parts of water instead of 8.0 parts of an aqueous polymer emulsion (A) yielding a polyurethane foam having the physical properties shown in Table 3.

COMPARATIVE EXAMPLE 2

A rigid polyurethane foam was prepared according to Example 4 using 6 parts of water instead of 10 parts of an aqueous polymer emulsion (D) yielding a polyurethane foam having the physical properties shown in Table 3.

COMPARATIVE EXAMPLE 3

A rigid polyurethane foam was prepared according to Example 10 using 1 part of water instead of 1.7 parts of an aqueous polymer emulsion (D) yielding a polyurethane foam having the physical properties shown in Table 5.

TABLE 5

| | Example 10 | Example 11 | Comparative Example 3 |
|---|---|---|---|
| Aqueous polymer emulsion | D | G | |
| Amount of aqueous polymer emulsion (wt part) | 1.7 | 1.4 | |
| Reactivity (sec): | | | |
| Cream time | 13 | 12 | 12 |
| Gel time | 26 | 26 | 25 |
| Rise Time | 37 | 36 | 35 |
| Tack free time | 55 | 54 | 35 |
| Physical properties of foam: | | | |
| Foam density (kg/m$^3$) | 24.5 | 23.1 | 25.6 |
| Dimensional stability (%) | | | |
| vertical to foaming direction | 0 | 0 | −2.8 |
| parallel to foaming direction | 0.1 | 0.3 | −34.5 |

Thus, in the preparation of rigid polyurethane foam according to the present invention, an aqueous polymer emulsion comprising a polymer of ethylenically unsaturated monomers emulsified in water can be used as a blowing agent instead of water and the resulting polyurethane foam has excellent physical properties as compared with any of those prepared using water as a blowing agent.

In addition, the process of this invention can be carried out by either no use or reduction of chlorofluorocarbon considered to be a cause of ozonosphere depression. Rigid polyurethane foam thus can be prepared by the process favorable to the environment without any adverse influence thereupon.

We claim:

1. In a process for the preparation of rigid polyurethane foam by reacting an organic polyisocyanate with a polyol in the presence of a urethane catalyst, a blowing agent and a silicone surfactant cell stabilizer, the improvement which comprises using as a blowing agent an aqueous polymer emulsion comprising a polymer of ethylenically unsaturated monomers selected from the group consisting of styrene, methyl methacrylate, butyl acrylate, 2-ethylhexyl acrylate, 2-hydroxyethyl acrylate or methacrylate, mono-acrylate or -methacrylate of polyethylene glycol, acrylic acid, methacrylic acid, and mixtures thereof, the aqueous polymer emulsion being used at 0.5 to 20 parts polymer/100 parts polyol.

2. The process of claim 1 in which the emulsion comprises 20 to 70 wt % polymer.

3. The process of claim 2 in which the emulsion is used at 1 to 15 parts polymer/100 parts polyol.

4. The process of claim 3 in which the emulsion comprises 30 to 50 wt % polymer.

5. The process of claim 4 in which the polymer comprises an ethylenically unsaturated monomer selected from the group consisting of styrene, acrylic acid, butyl acrylate, 2-hydroxyethylmethacryate, polyethylene glycol monomethacrylate, 2-ethylhexyl acrylate and mixtures thereof.

6. In a process for the preparation of rigid polyurethane foam by reacting an organic polyisocyanate with a polyol in the presence of, a urethane catalyst, a blowing agent and a silicone surfactant cell stabilizer, the improvement which comprises using as a blowing agent an aqueous polymer emulsion comprising 20 to 70 wt % polymer of ethylenically unsaturated monomers selected from the group consisting of styrene, methyl methacrylate, butyl acrylate, 2-ethylhexyl acrylate, 2-hydroxyethyl acrylate or methacrylate, mono-acrylate or -methacrylate of polyethylene glycol, acrylic acid, methacrylic acid, and mixtures thereof, the aqueous polymer emulsion being used at 1 to 15 parts polymer/100 parts polyol.

7. The process of claim 6 in which the emulsion is used at 1 to 10 parts polymer/100 parts polyol.

8. The process of claim 7 in which the emulsion comprises 30 to 50 wt % polymer.

9. The process of claim 8 in which the polymer comprises an ethylenically unsaturated monomer selected from the group consisting of styrene, acrylic acid, butyl acrylate, 2-hydroxyethylmethacryate, polyethylene glycol monomethacrylate, 2-ethylhexyl acrylate and mixtures thereof.

10. A rigid polyurethane foam prepared by a process according to claim 1.

11. A rigid polyurethane foam prepared by a process according to claim 2.

12. A rigid polyurethane foam prepared by a process according to claim 3.

13. A rigid polyurethane foam prepared by a process according to claim 4.

14. A rigid polyurethane foam prepared by a process according to claim 5.

15. A rigid polyurethane foam prepared by a process according to claim 6.

16. A rigid polyurethane foam prepared by a process according to claim 7.

17. A rigid polyurethane foam prepared by a process according to claim 8.

18. A rigid polyurethane foam prepared by a process according to claim 9.

* * * * *